US009965977B2

(12) United States Patent
Been et al.

(10) Patent No.: US 9,965,977 B2
(45) Date of Patent: May 8, 2018

(54) ADJUSTABLE LUMBAR SPINE ASSEMBLY FOR CRASH TEST DUMMY

(71) Applicant: Humanetics Innovative Solutions, Inc., Plymouth, MI (US)

(72) Inventors: Bernard W. Been, The Hague (NL); Michel J. Salloum, Ypsilanti, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 180 days.

(21) Appl. No.: 14/980,655

(22) Filed: Dec. 28, 2015

(65) Prior Publication Data
US 2016/0189569 A1    Jun. 30, 2016

Related U.S. Application Data

(60) Provisional application No. 62/098,751, filed on Dec. 31, 2014.

(51) Int. Cl.
G09B 23/28    (2006.01)
G09B 23/32    (2006.01)
G09B 23/34    (2006.01)

(52) U.S. Cl.
CPC ............ *G09B 23/32* (2013.01); *G09B 23/34* (2013.01)

(58) Field of Classification Search
USPC .................. 434/262, 267, 274; 72/172, 866.4
See application file for complete search history.

(56) References Cited

U.S. PATENT DOCUMENTS

| 2,108,229 A * | 2/1938 | Metz ...................... G09B 23/32 434/274 |
| 3,740,871 A * | 6/1973 | Berton .................... A63H 3/003 434/267 |
| 3,753,301 A | 8/1973 | Daniel et al. |
| 3,762,069 A | 10/1973 | Culver |

(Continued)

FOREIGN PATENT DOCUMENTS

| DE | 2330093 | 1/1974 |
| DE | 4012691 A1 | 10/1990 |

(Continued)

OTHER PUBLICATIONS

"THOR-NT User's Manual", Mar. 2005 [retrieved online Oct. 12, 2017].*

(Continued)

*Primary Examiner* — Kurt Fernstrom
(74) *Attorney, Agent, or Firm* — Howard & Howard Attorneys PLLC

(57) ABSTRACT

An adjustable lumbar spine assembly for a crash test dummy includes an upper member adapted to be connected to an upper thoracic portion of a spine of the crash test dummy, a lower member adapted to be connected to a lower thoracic portion of the spine of the crash test dummy, an upper abdomen interface connected to the lower member and adapted to be connected to an upper abdomen portion of the crash test dummy, and an adjustment mechanism cooperating with the upper member and the lower member to allow adjustment of varying fixed joint angles between the upper member and the lower member.

22 Claims, 6 Drawing Sheets

(56) References Cited

U.S. PATENT DOCUMENTS

| | | | | |
|---|---|---|---|---|
| 3,762,070 | A * | 10/1973 | Culver | G09B 23/32 434/274 |
| 3,877,156 | A | 4/1975 | Itoh | |
| 3,962,801 | A * | 6/1976 | Gonzalez | G09B 23/32 434/274 |
| 4,200,995 | A * | 5/1980 | Trella | G09B 23/34 434/274 |
| 4,261,113 | A | 4/1981 | Alderson | |
| 4,488,433 | A | 12/1984 | Denton et al. | |
| 4,872,841 | A * | 10/1989 | Hamilton | G09B 23/30 434/274 |
| 4,948,373 | A | 8/1990 | Engels | |
| 5,018,977 | A | 5/1991 | Wiley et al. | |
| 5,152,692 | A | 10/1992 | Richards | |
| 5,317,931 | A | 6/1994 | Kalami | |
| 5,526,707 | A | 6/1996 | Smrcka | |
| 5,528,943 | A | 6/1996 | Smrcka et al. | |
| 5,589,651 | A | 12/1996 | Viano et al. | |
| 5,665,922 | A | 9/1997 | Tsukada et al. | |
| 5,741,989 | A | 4/1998 | Viano et al. | |
| 6,206,703 | B1 * | 3/2001 | O'Bannon | G01M 17/0078 434/267 |
| 6,422,874 | B1 * | 7/2002 | Green | G09B 23/32 434/256 |
| 6,439,070 | B1 | 8/2002 | Beebe et al. | |
| 6,749,433 | B2 | 6/2004 | Kassai et al. | |
| 6,982,409 | B2 | 1/2006 | Huang et al. | |
| 7,086,273 | B2 | 8/2006 | Lipmyer | |
| 7,508,530 | B1 | 3/2009 | Handman | |
| 7,878,080 | B2 | 2/2011 | Hwang et al. | |
| 7,891,259 | B2 * | 2/2011 | Kim | G01M 99/001 73/172 |
| 7,942,676 | B2 * | 5/2011 | Murdach | G09B 23/30 434/262 |
| RE42,418 | E | 6/2011 | Lipmyer | |
| 8,113,847 | B2 * | 2/2012 | Boachie-Adjei | G09B 23/32 434/274 |
| 8,840,404 | B2 * | 9/2014 | Arthur | G09B 23/28 434/274 |
| 8,844,917 | B2 * | 9/2014 | Buske | B63B 9/06 269/143 |
| 9,011,158 | B2 * | 4/2015 | Merkle | G09B 23/30 434/274 |
| 9,564,069 | B2 * | 2/2017 | Wang | G09B 23/32 |
| 9,754,514 | B2 * | 9/2017 | Gibbs | G09B 23/32 |
| 2004/0029090 | A1 | 2/2004 | Kassai et al. | |
| 2004/0118229 | A1 * | 6/2004 | Reynolds | A47C 31/126 73/866.4 |
| 2005/0126258 | A1 | 6/2005 | Lipmyer | |
| 2009/0025492 | A1 | 1/2009 | Hwang et al. | |
| 2013/0000426 | A1 | 1/2013 | Arthur et al. | |
| 2013/0252220 | A1 * | 9/2013 | Wang | G09B 23/32 434/274 |
| 2013/0327164 | A1 | 12/2013 | Wang | |
| 2014/0190279 | A1 | 7/2014 | Been et al. | |
| 2014/0190280 | A1 | 7/2014 | Been et al. | |
| 2014/0294485 | A1 | 10/2014 | McInnis et al. | |
| 2015/0086957 | A1 * | 3/2015 | Gibbs | G09B 23/32 434/267 |
| 2015/0170548 | A1 * | 6/2015 | McClintock | G09B 23/32 434/275 |

FOREIGN PATENT DOCUMENTS

| | | |
|---|---|---|
| DE | 4117046 A1 | 11/1991 |
| DE | 102004058022 A1 | 6/2005 |
| DE | 102007062761 B4 | 9/2013 |
| DE | 102013009815 A1 | 12/2013 |
| EP | 0709665 A2 | 5/1996 |
| EP | 1388833 A1 | 2/2004 |
| EP | 1388833 B1 | 9/2009 |
| EP | 1388833 B8 | 11/2009 |
| FR | 2018158 | 5/1970 |
| FR | 1503956 | 3/1978 |
| FR | 2646266 A1 | 10/1990 |
| GB | 2231433 A | 11/1990 |
| GB | 2244843 A | 12/1991 |
| GB | 2231433 B | 5/1993 |
| GB | 2244843 B | 4/1994 |
| GB | 2344922 A | 6/2000 |
| JP | 50114835 | 9/1975 |
| JP | 2005227266 A | 8/2005 |
| JP | 2012202708 A | 10/2012 |
| JP | 2013257322 A | 12/2013 |
| JP | 5664391 B2 | 2/2015 |
| WO | 9830995 | 7/1998 |
| WO | 9847122 | 10/1998 |

OTHER PUBLICATIONS

European Search Report (EP Application No. 15 203 038.3); dated Jun. 19, 2017.
European Search Report dated Mar. 14, 2016 for European Application No. EP 15 20 3038.
NHTSA: "Thor-NT User Manual", Mar. 1, 2005, XP055257981, retrieved from the Internet: URL: http://www.nhtsa.gov/DOT/NHTSA/NVS/Biomechanics%20&%20Trauma/THOR-NT%20Advanced%20Crash%Test%Dummy/USERSMANUAL.pdf [retrieved on Mar. 14, 2016] Sections 2.7, 3.1, 6.3; figures 2.7, 2.8, 6.9, 6.10, 9.15, 17.11, 6.17.
P/N Sherline Products: "Design of the Tilting Angle Table", XP055257929, retrieved from the Internet: URL: http://www.nsa.kpu-m.ac.jp/gijutu/www.sherline.com/3750inst.pdf [retrieved on Mar. 14, 2016].
"Tilting Bracket", Aug. 28, 2012, XP055258033, retrieved from the Internet: URL: http://www.amazon.com/Accommodate-Televisions-75-inch-tall-Monitors-Ooptional/dp/B00937MBHG/ref-sr_1_11?srs=4639291011&ie=UTF8&qid=1457962048&sr=8-11&keywords=tilting+mount [retrieved on Mar. 14, 2016].

* cited by examiner

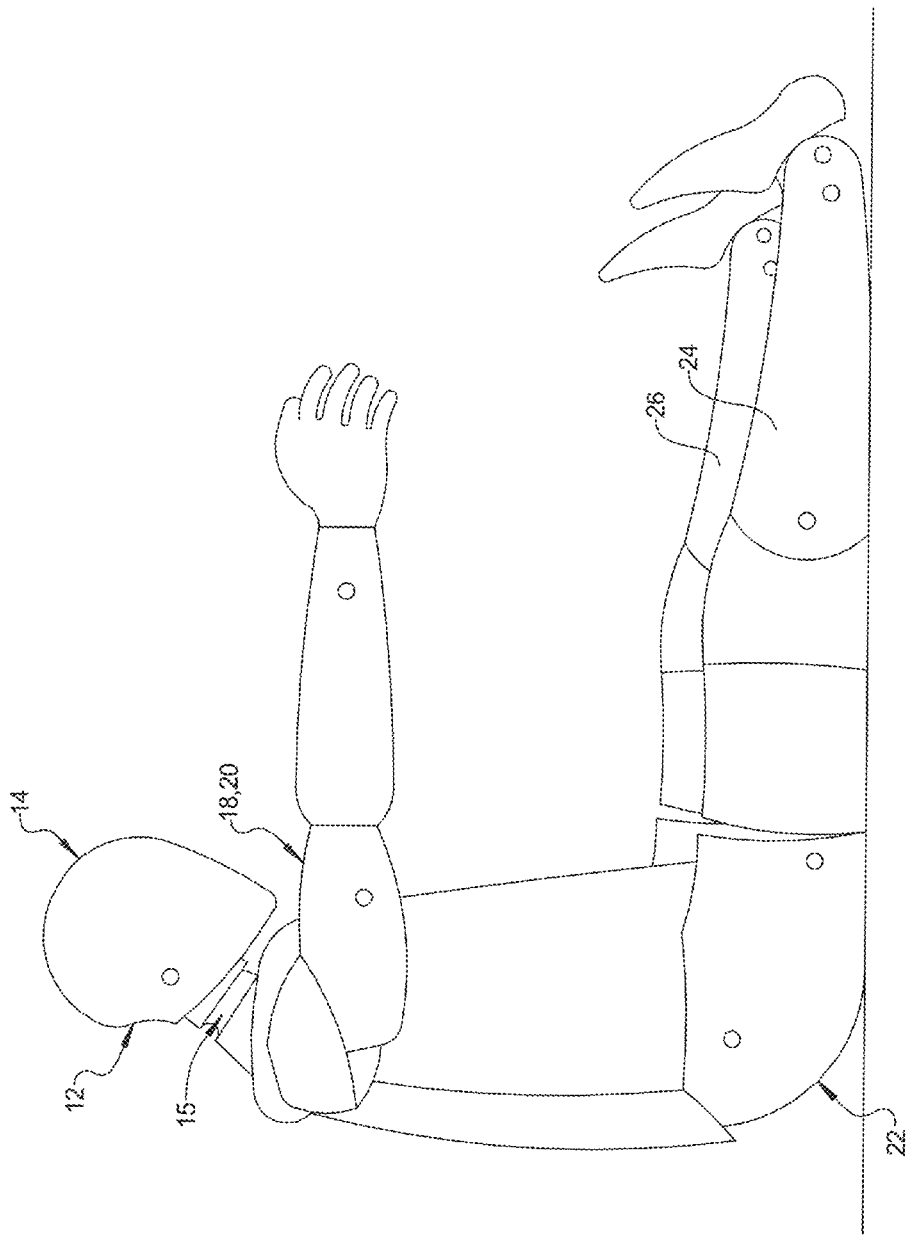

ADJUSTABLE LUMBAR SPINE ASSEMBLY FOR CRASH TEST DUMMY

CROSS-REFERENCE TO RELATED APPLICATION(S)

The present application claims priority to and all the benefits of U.S. Provisional Patent Application No. 62/098,751, filed Dec. 31, 2014, which is expressly incorporated herein by reference in its entirety.

BACKGROUND OF THE INVENTION

1. Field of the Invention

The present invention relates generally to Anthropomorphic Test Devices (ATD) and, more particularly, to an adjustable lumbar spine assembly for an ATD that can be used to assess and predict injuries under crash, under body explosive, and aerospace ejection seat testing environments.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angle rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD design engineers design crash test dummies with the proper anthropometry that reflects a total weight, center of gravity, mass moment of inertia and range of motion similar to that of a human body so as to increase the biofidelity of the crash test dummy.

However, it has been difficult to replicate the human spine for a crash test dummy. In one crash test dummy, a lower lumbar of a spine was fixed and not adjustable. In addition, there was no integrated on-board data acquisition system for the crash test dummy.

Accordingly, it is desirable to provide a lumbar spine for a crash test dummy that has improved biofidelity for the crash test dummy. It is also desirable to provide a lumbar spine for a crash test dummy that can be adjusted. It is further desirable to provide an adjustable lumbar spine for a crash test dummy that can accommodate an on-board data acquisition system. Therefore, there is a need in the art to provide an adjustable lumbar spine for use in a crash test dummy so that biofidelity of the crash test dummy is improved.

SUMMARY OF THE INVENTION

Accordingly, the present invention is an adjustable lumbar spine assembly for a crash test dummy. The adjustable lumbar spine assembly includes an upper member adapted to be operatively connected to an upper thoracic portion of a spine of the crash test dummy, a lower member adapted to be operatively connected to a lower thoracic portion of the spine of the crash test dummy, an upper abdomen interface connected to the lower member and adapted to be connected to an upper abdomen portion of the crash test dummy, and an adjustment mechanism cooperating with the upper member and the lower member to allow adjustment of varying fixed joint angles between the upper member and the lower member.

In addition, the present invention is a crash test dummy including a body having a spine with an upper thoracic portion and a lower thoracic portion. The body also includes an upper abdomen and an adjustable lumbar spine assembly connected to the spine. The adjustable lumbar spine assembly includes an upper member operatively connected to the upper thoracic portion, a lower member operatively connected to the lower thoracic portion, an upper abdomen interface connected to the lower member and connected to the upper abdomen portion, and an adjustment mechanism cooperating with the upper member and the lower member to allow adjustment of varying fixed joint angles between the upper member and the lower member.

One advantage of the present invention is that an adjustable lumbar spine assembly is provided for a crash test dummy. Another advantage of the present invention is that the adjustable lumbar spine assembly for a crash test dummy represents a human spine with the ability to adjust the spine inclination in four fixed dummy seating postures: "erect"; "neutral"; "slouched"; and "super slouched". Yet another advantage of the present invention is that the adjustable lumbar spine assembly for a crash test dummy has only four specified positions, which makes it easier to identify and find the desired position. Still another advantage of the present invention is that the adjustable lumbar spine assembly for a crash test dummy allows easier adjustment, as the upper half of the dummy remains stable about an anterior-posterior axis during adjustment. A further advantage of the present invention is that the adjustable lumbar spine assembly for a crash test dummy provides a generic large space for packaging components for on-board data acquisition systems in various arrangements. Yet a further advantage of the present invention is that the adjustable lumbar spine assembly for a crash test dummy provides for drop in replacement of original components without having to change interfaces of adjacent components. Still a further advantage of the present invention is that the adjustable lumbar spine assembly for a crash test dummy includes a modified and simplified abdomen interface. Another advantage of the present invention is that the adjustable lumbar spine assembly for a crash test dummy provides reduced manufacturing costs, number of parts, and complexity of the parts. Yet another advantage of the present invention is that the adjustable lumbar spine assembly for a crash test dummy interfaces to instrumentation for tri-axial linear acceleration and tri-axial angular rate, as well as bi-axial tilt.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is an elevational view of a crash test dummy, according to one embodiment.

DESCRIPTION OF THE PREFERRED EMBODIMENT(S)

Figure 1A:
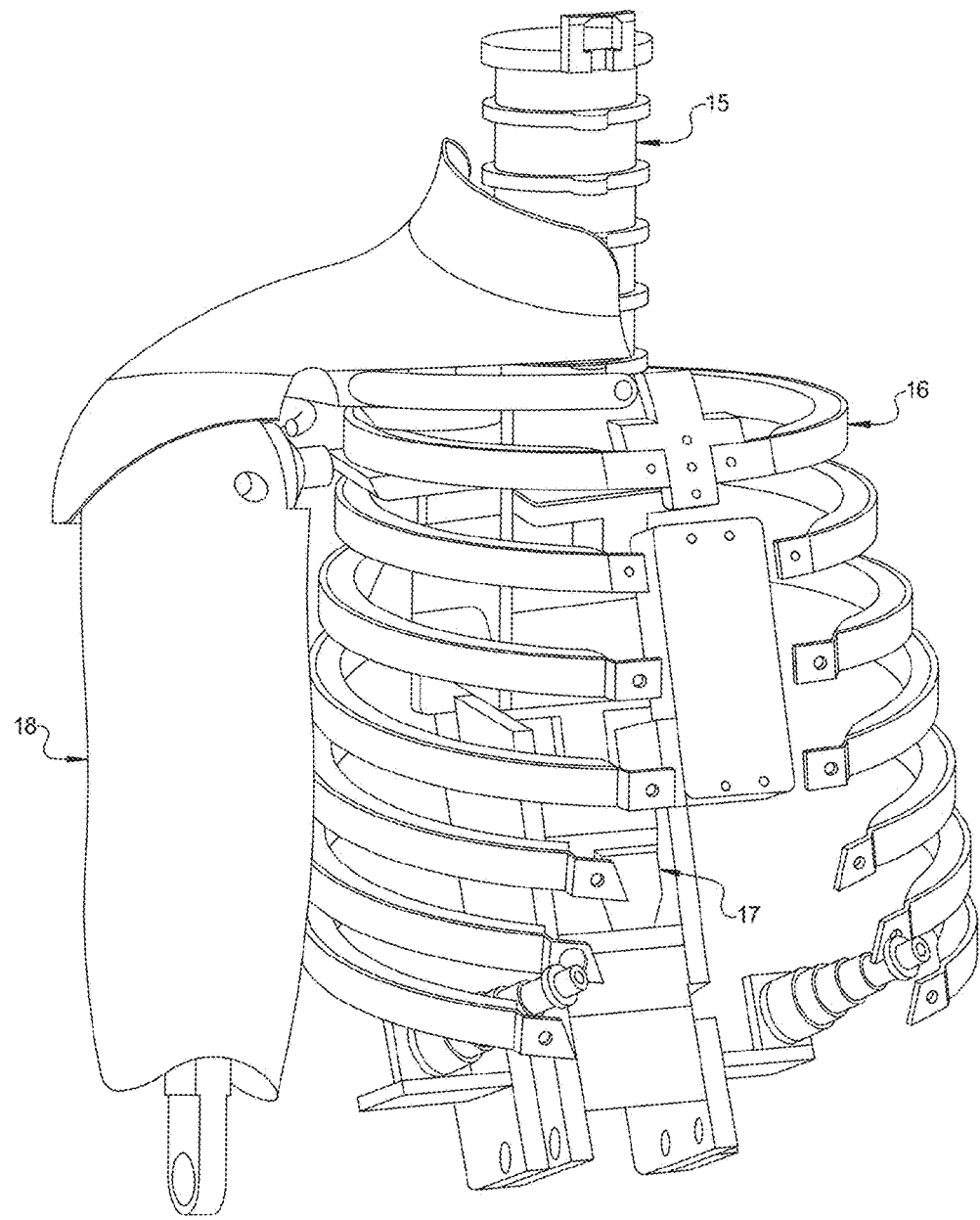
FIG. 1A is a perspective view of a portion of the crash test dummy of FIG. 1.
Figure 2:
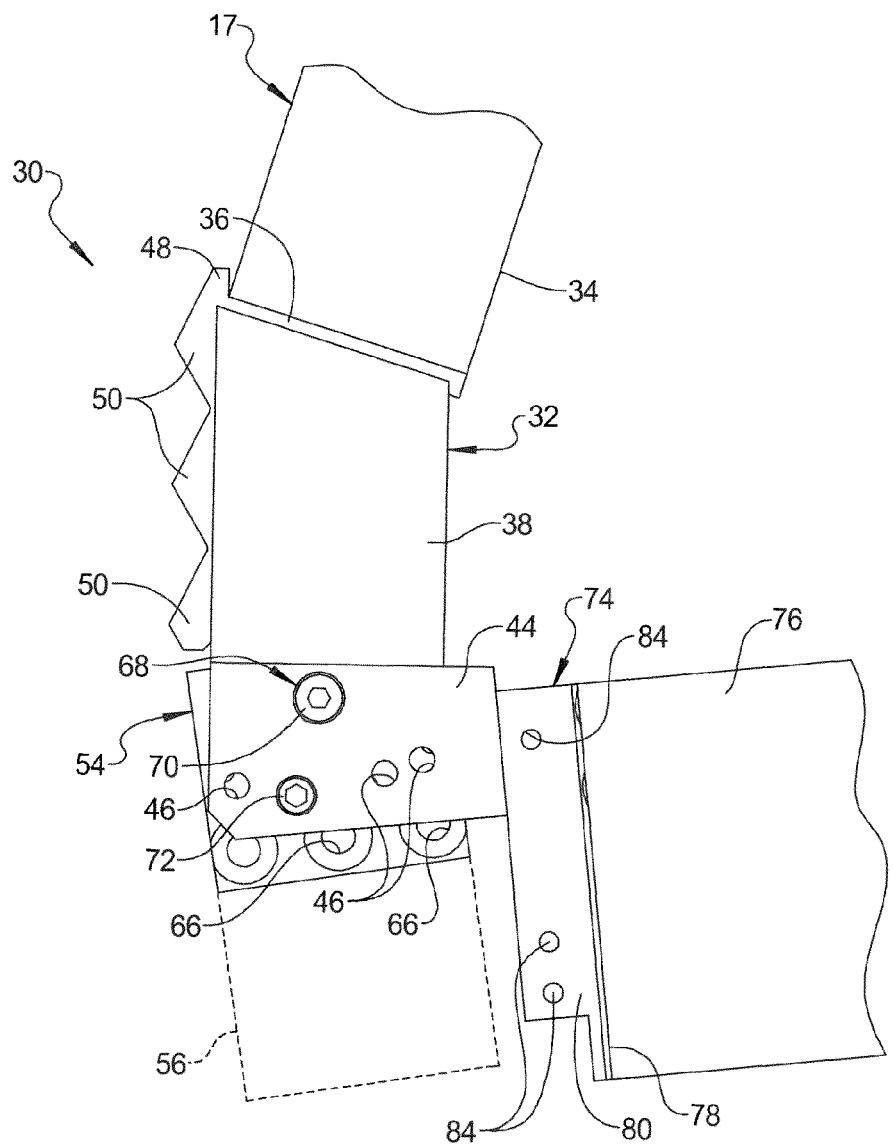
FIG. 2 is an elevational view of one embodiment of an adjustable lumbar spine assembly, according to the present invention, illustrated in operational relationship with a portion of the crash test dummy of FIGS. 1 and 1A.

Referring to the drawings and in particular FIGS. 1 and 1A, one embodiment of a crash test dummy is generally indicated at 12. The crash test dummy 12 is of a fiftieth percentile (50%) male type and is illustrated in a seated position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a neck assembly, generally indicated at 15, having an upper end mounted to the head assembly 14. The crash test dummy 12 includes a spine assembly, generally indicated at 17, having an upper end mounted to the neck assembly 15 via a neck pitch change mechanism assembly (not shown). The spine assembly 17 has a lower end extending into a torso area of the crash test dummy 12 and is connected to a thoracic spine load cell to be described.

The torso area of the crash test dummy 12 includes a rib cage assembly 16 connected to the spine assembly 17. The crash test dummy 12 also has a pair of arm assemblies including a right arm assembly 18 and a left arm assembly 20, which are attached to the crash test dummy 12. It should be appreciated that the right arm assembly 18 and left arm assembly 20 are connected through a right shoulder assembly and left shoulder assembly, respectively, to the top of the spine assembly 17.

The crash test dummy 12 further includes a pelvis assembly 22 connected to a pelvis/lumbar spine mounting block of the spine assembly 17. The crash test dummy 12 includes a right leg assembly 24 and a left leg assembly 26, which are attached to the pelvis assembly 22. It should also be appreciated that various components of the crash test dummy 12 are covered in a urethane skin such as a flesh and skin assembly (not shown) for improved coupling with the skeleton of the crash test dummy 12. It should further be appreciated that a lifting bracket (not shown) may be attached to an upper portion of the spine assembly 17 for lifting the crash test dummy 12 into and out of test fixtures and vehicles.

Figure 3:
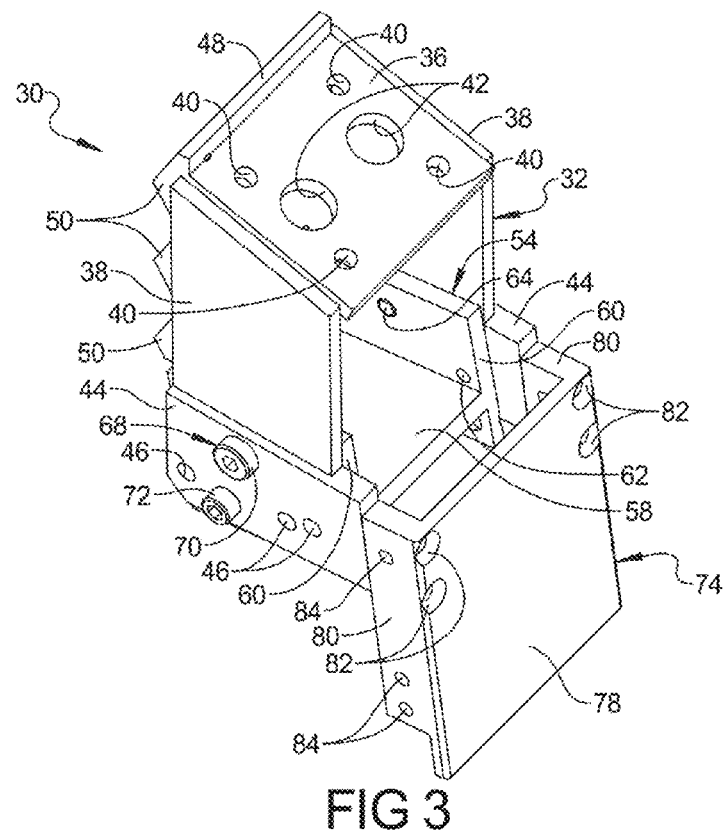
FIG. 3 is a top perspective view of the adjustable lumbar spine assembly of FIG. 2.
Figure 4:
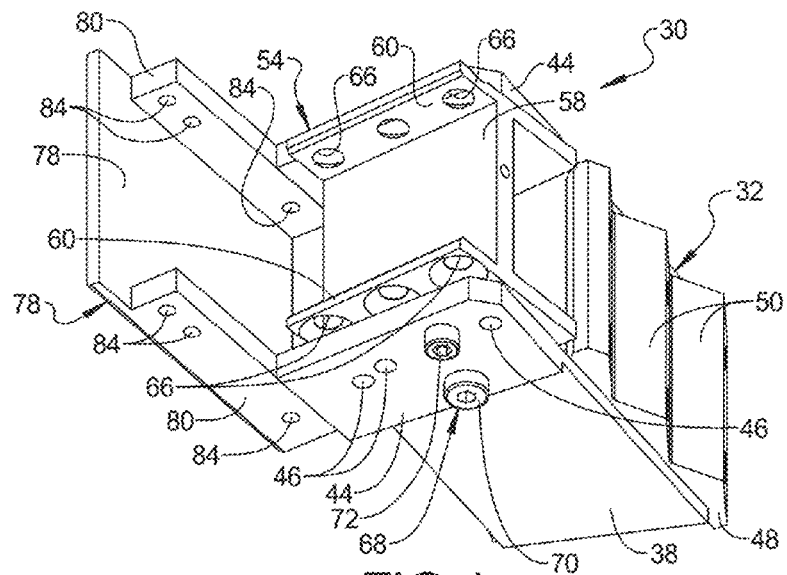
FIG. 4 is a bottom perspective view of the adjustable lumbar spine assembly of FIG. 2.
Figure 5:
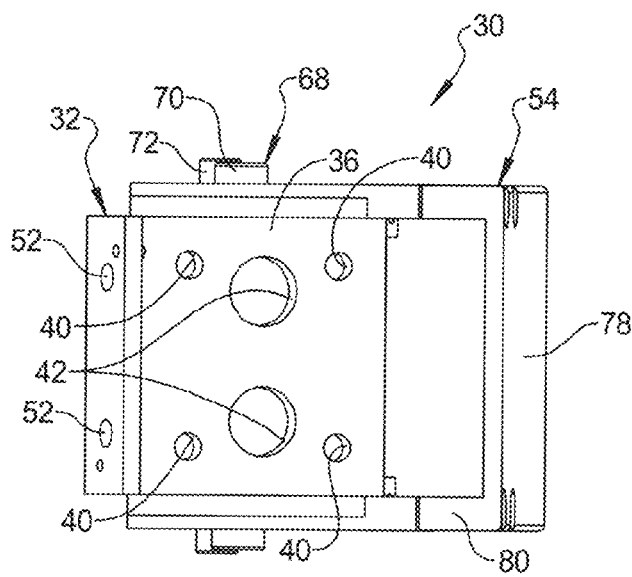
FIG. 5 is a top plan view of the adjustable lumbar spine assembly of FIG. 2.
Figure 6:
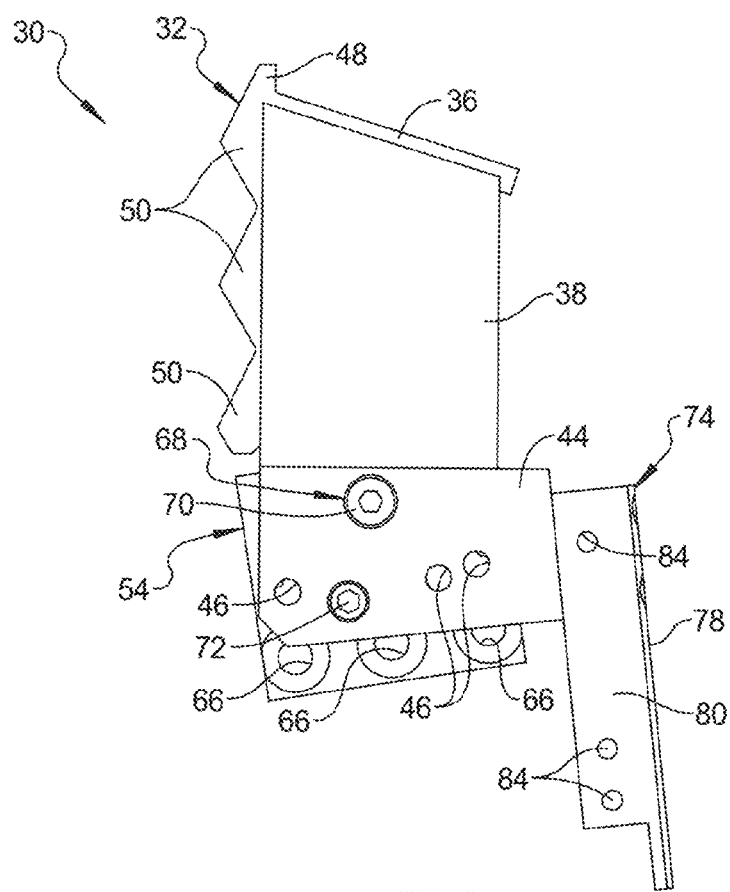
FIG. 6 is a side elevational view of the adjustable lumbar spine assembly of FIG. 2.
Figure 7:
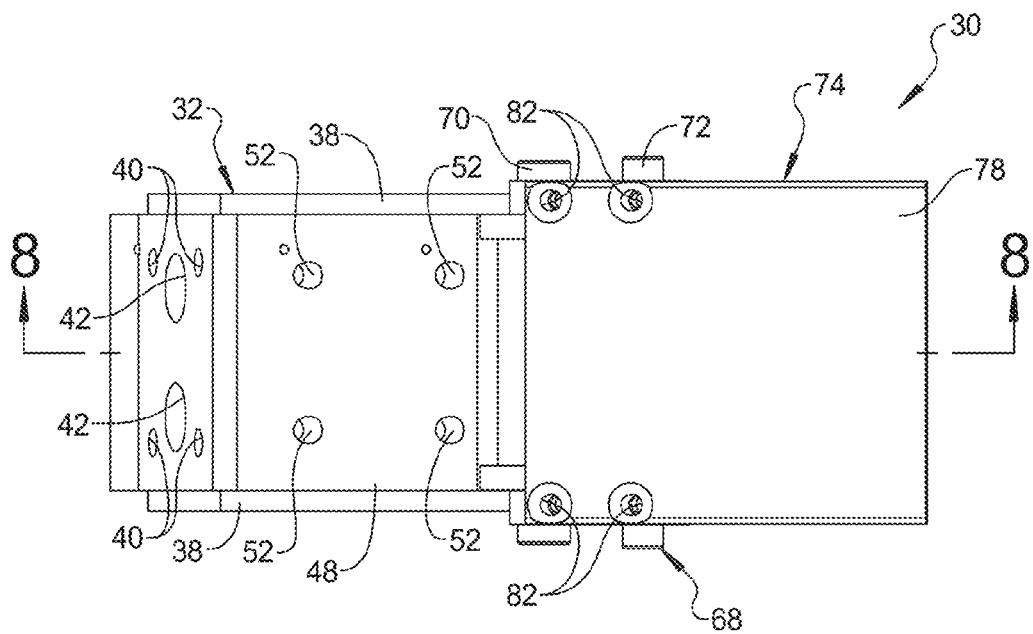
FIG. 7 is a front elevational view of the adjustable lumbar spine assembly of FIG. 2.
Figure 8:
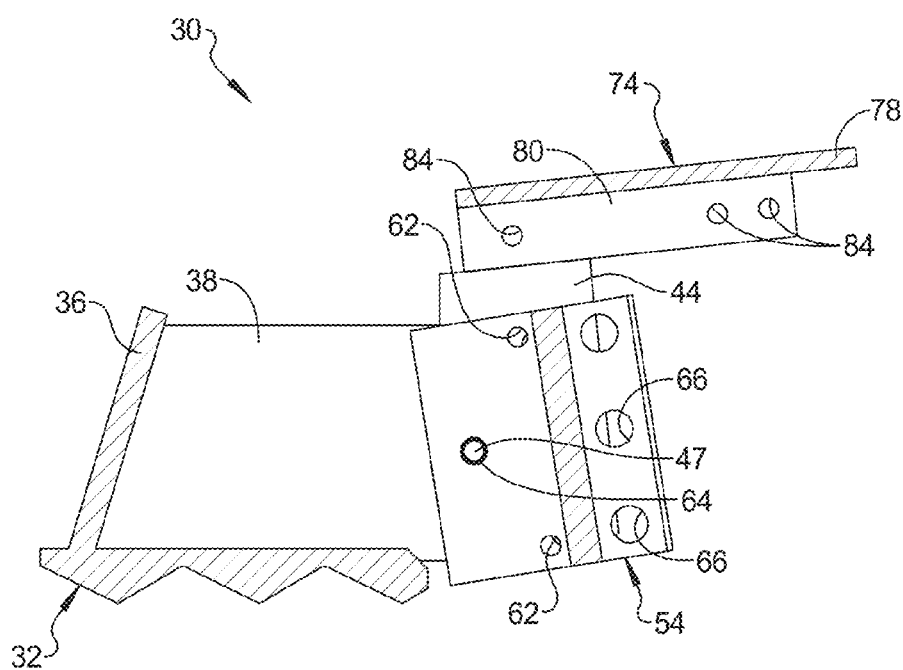
FIG. 8 is a sectional view taken along line 8-8 of FIG. 7.

Referring to FIG. 3, one embodiment of an adjustable lumbar spine assembly 30, according to the present invention, is shown in operational relationship with the crash test dummy 12. The adjustable lumbar spine assembly 30 represents a human lumbar spine. The adjustable lumbar spine assembly 30 is disposed between an upper thoracic assembly to be described of the spine assembly 17 and a thoracic spine load cell to be described of the spine assembly 17. It should be appreciated that the spine assembly 17 may include additional components (not shown) such as a lumbar spine flex joint (not shown) disposed between the thoracic spine load cell and the pelvis/lumbar spine mounting block. It should also be appreciated that the adjustable lumbar spine assembly 30 replaces a portion of the spine assembly 17 illustrated in FIG. 1A. It should further be appreciated that, except for the adjustable lumbar spine assembly 30 according to the present invention, the remaining components of the spine assembly 17 are conventional.

As illustrated in FIGS. 3 through 8, the adjustable lumbar spine assembly 30 includes a first or upper member, generally indicated at 32, operatively connected to an upper thoracic assembly 34 of the crash test dummy 12. In the embodiment illustrated, the upper member 32 has an upper wall 36 and a pair of side walls 38 extending downwardly from the upper wall 36. The upper wall 36 is generally rectangular in shape, but may be any suitable shape. Each of the side walls 38 is generally rectangular in shape, but may be any suitable shape. The upper wall 36 includes at least one, preferably a plurality of first apertures 40 and second apertures 42 extending axially therethrough. The first apertures 40 receive fasteners (not shown) to connect the upper wall 36 to the upper thoracic assembly 34. The second apertures 42 have a diameter greater than the first apertures 40 to provide clearance of an adjacent upper thoracic spine flex joint of the upper thoracic assembly 34. The side walls 38 have a lower flange 44 extending downwardly and outwardly. The lower flange 44 is generally rectangular in shape, but may be any suitable shape. The lower flange 44 includes at least one, preferably a plurality of first apertures 46 and a second aperture 47 extending axially therethrough to receive fasteners to be described. In one embodiment, the first apertures 46 may be countersunk holes. It should be appreciated that the upper wall 36 acts as an interface on the upper thoracic spine flex joint that is directly mounted to the spine assembly 17.

The upper member 32 also includes a rear wall 48 extending downwardly from the upper wall 36 and between the side walls 38. The rear wall 48 is generally rectangular in shape, but may be any suitable shape. The rear wall 48 includes at least one, preferably a plurality of projections or interfaces 50 extending rearwardly. The interfaces 50 are generally triangular in shape, but may be any suitable shape, for mounting ribs of the rib cage assembly 16. The rear wall 48 also includes at least one, preferably a plurality of apertures 52 extending therethrough. In the embodiment illustrated, there are six (6) apertures that are threaded for mounting the ribs. The upper member 32 is made of a rigid material such as metal. It should be appreciated that the upper member 32 is integral, unitary, and one-piece.

Referring to FIGS. 2 through 8, the adjustable lumbar spine assembly 30 also includes a second or lower member, generally indicated at 54, cooperating with the upper member 32. As illustrated in the FIG. 2, the lower member 54 of the adjustable lumbar spine assembly 30 is connected to a thoracic spine load cell adapter 56 of the complete spine assembly 17. In the embodiment illustrated, the lower member 54 has a lower wall 58 and a pair of side walls 60 extending upwardly from the lower wall 58. The lower wall 58 is spaced between the ends of the side walls 60. The lower wall 58 is generally rectangular in shape, but may be any suitable shape. Each of the side walls 60 is generally rectangular in shape, but may be any suitable shape. Each side wall 60 includes at least one, preferably a plurality of first apertures 62, second apertures 64, and third apertures 66 extending axially therethrough. The third apertures 66 receive fasteners (not shown) to connect the lower member 54 to the thoracic spine load cell adapter 56. The lower member 54 is made of a rigid material such as a metal material. It should be appreciated that the lower member 54 is integral, unitary, and one-piece.

As illustrated in FIGS. 2 through 8, the adjustable lumbar spine assembly 30 includes an adjustment mechanism, generally indicated at 68, cooperating with the upper member 32 and the lower member 54 to allow adjustment of varying fixed joint angles between the upper member 32 and the lower member 54. In one embodiment, the adjustment mechanism 68 includes a first fastener 70 to pivotally connect the upper member 32 and the lower member 54 together. The first fastener 70 is a shoulder bolt extending through the second apertures 47 and 64 to pivotally fasten the upper member 32 and the lower member 54 together. The adjustment mechanism 68 also includes one or more second fasteners 72 to fasten the upper member 32 and lower member 54 in a fixed joint angle therebetween. In one embodiment, the second fasteners 72 are countersunk screws. The second fastener 72 is a bolt that extends through one of the first apertures 46 and 62 in the side walls 38 and 60 of the upper member 32 and lower member 54, respectively. In one embodiment, at least two second fasteners 72 are used on each side. In the embodiment illustrated, the first apertures 46 and 62 form four (4) different fixed joint angles about a lateral axis extending through the fastener 70 between the upper member 32 and lower member 54, respectively. It should be appreciated that the fasteners 70 and 72 have a threaded portion to threadably engage the first apertures 46 and 62. It should also be appreciated that the fasteners 70 and 72 may be of any suitable type for allowing the side walls 38, 60 of the upper member 32 and lower member 54 to be fastened together.

The adjustable lumbar spine assembly 30 includes an upper abdomen interface, generally indicated at 74, connected between the upper member 32 and an upper abdomen assembly 76. The upper abdomen interface 74 has a front wall 78 and a pair of side walls 80 extending rearwardly from the front wall 78. The front wall 78 is generally rectangular in shape, but may be any suitable shape. Each of the side walls 80 is generally rectangular in shape, but may be any suitable shape. The front wall 78 includes a plurality of apertures 82 to receive fasteners (not shown) to attach the upper abdomen interface 74 to the lower flanges 44 of the upper member 32. Each side wall 80 includes at least one, preferably a plurality of apertures 84 extending axially therethrough. The upper abdomen interface 74 is made of a rigid material such as a metal material. It should be appreciated that the upper abdomen interface 74 is integral, unitary, and one-piece. It should also be appreciated that the upper abdomen is a region on the crash test dummy 12 that represents the lower thoracic cavity and fills the volume between the three lowest ribs of the rib cage assembly 16, above the lower abdomen and in front of the spine assembly 17.

In the embodiment illustrated, there are four (4) different fixed joint angles between the upper member 32 and lower member 54. The joint angles range from negative nine degrees (−9°), neutral zero degrees (0°), positive nine degrees (9), and positive twelve degrees (12°) relative to the axis extending axially through the first fastener 70. These joint angles correspond to the seating positions: "erect"; "neutral"; "slouched": and "super slouched". To adjust the spine inclination of the lumbar spine assembly 30, the second fastener 72 is removed from the first apertures 46 and 62 in the side walls 38 and 60 of the upper member 32 and lower member 54, respectively. The upper member 32 is pivoted about the first fastener 70 relative to the lower member 54 or visa versa. The second fastener 72 is inserted into corresponding first apertures 46 and 62 for a different joint angle in the side walls 38 and 60 of the upper member 32 and lower member 54, respectively. It should be appreciated that the upper and lower members 32 and 54 form the predetermined or fixed angles for the prescribed dummy postures or seating positions. It should also be appreciated that more joint angles could be created if necessary by varying the angle of the upper and lower members 32 and 54 that allows the adjustable lumbar spine assembly 30 to have different inclinations to present different human seating postures. It should further be appreciated that the joint angles allow for the adjustable lumbar spine assembly 30 to have an adjustable curvature. It should still further be appreciated that the adjustable lumbar spine assembly 30 allows a relatively large generic space for the integration of systems (not shown) such as a data acquisition system (not shown).

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An adjustable lumbar spine assembly for a crash test dummy comprising:
   an upper member adapted to be operatively connected to an upper thoracic portion of a spine of the crash test dummy;
   a lower member adapted to be operatively connected to a lower thoracic portion of the spine of the crash test dummy;
   an upper abdomen interface connected to said upper member and adapted to be connected to an upper abdomen portion of the crash test dummy; and
   an adjustment mechanism cooperating with said upper member and said lower member to allow adjustment at different increments of adjustment about a lateral axis between said upper member and said lower member for a predetermined number of different and varying fixed joint angles about the lateral axis between said upper member and said lower member.

2. An adjustable lumbar spine assembly as set forth in claim 1 wherein said adjustment mechanism comprises a first fastener to pivotally connect said upper member and said lower member together.

3. An adjustable lumbar spine assembly as set forth in claim 2 wherein said upper member has an upper wall and a pair of side walls extending downwardly from said upper wall.

4. An adjustable lumbar spine assembly as set forth in claim 3 wherein said lower member has a lower wall and a pair of side walls extending upwardly from said lower wall.

5. An adjustable lumbar spine assembly as set forth in claim 4 wherein said first fastener extends through said side walls of said upper member and said lower member.

6. An adjustable lumbar spine assembly as set forth in claim 5 wherein said upper member includes a plurality of apertures extending through said side walls.

7. An adjustable lumbar spine assembly as set forth in claim 6 wherein said lower member includes a plurality of apertures extending through said side walls.

8. An adjustable lumbar spine assembly as set forth in claim 7 wherein said adjustment mechanism comprises a second fastener extending through one of said apertures in said upper member and said lower member to fix said upper member and said lower member in one of the joint angles.

9. An adjustable lumbar spine assembly as set forth in claim 1 wherein said joint angles range from negative nine degrees (−9°), neutral zero degrees (0°), positive nine degrees (9), and positive twelve degrees (12°).

10. An adjustable lumbar spine assembly as set forth in claim 1 wherein said upper member and said lower member are made of a rigid material.

11. A crash test dummy comprising:
a body including a spine having an upper thoracic portion and a lower thoracic portion, said body including an upper abdomen portion;
an adjustable lumbar spine assembly connected to said spine; and
said adjustable lumbar spine assembly comprising an upper member operatively connected to said upper thoracic portion, a lower member operatively connected to said lower thoracic portion, an upper abdomen interface connected to said upper member and said upper abdomen portion, and an adjustment mechanism cooperating with said upper member and said lower member to allow adjustment at different increments of adjustment about a lateral axis between said upper member and said lower member for a predetermined number of different and varying fixed joint angles about lateral axis between said upper member and said lower member.

12. A crash test dummy as set forth in claim 11 wherein said adjustment mechanism comprises a first fastener to pivotally connect said upper member and said lower member together.

13. A crash test dummy as set forth in claim 12 wherein said upper member has an upper wall and a pair of side walls extending downwardly from said upper wall.

14. A crash test dummy as set forth in claim 13 wherein said lower member has a lower wall and a pair of side walls extending upwardly from said lower wall.

15. A crash test dummy as set forth in claim 14 wherein said first fastener extends through said side walls of said upper member and said lower member.

16. A crash test dummy as set forth in claim 15 wherein said upper member includes a plurality of apertures extending through said side walls.

17. A crash test dummy as set forth in claim 16 wherein said lower member includes a plurality of apertures extending through said side walls.

18. A crash test dummy as set forth in claim 17 wherein said adjustment mechanism comprises a second fastener extending through one of said apertures in said upper member and said lower member to fix said upper member and said lower member in one of the joint angles.

19. A crash test dummy as set forth in claim 11 wherein said joint angles range from negative nine degrees (−9°), neutral zero degrees (0°), positive nine degrees (9), and positive twelve degrees (12°).

20. A crash test dummy as set forth in claim 11 wherein said upper member and said lower member are made of a rigid material.

21. A crash test dummy as set forth in claim 11 including interfaces for instrumentation for tri-axial linear acceleration and tri-axial angular rate and bi-axial tilt.

22. An adjustable lumbar spine assembly for a crash test dummy comprising:
an upper member adapted to be operatively connected to an upper thoracic portion of a spine of the crash test dummy, said upper member including a plurality of first side walls and a plurality of first apertures extending through said first side walls;
a lower member adapted to be operatively connected to a lower thoracic portion of the spine of the crash test dummy, said lower member including a plurality of second side walls and a plurality of second apertures extending through said second side walls;
an upper abdomen interface connected to said upper member and adapted to be connected to an upper abdomen portion of the crash test dummy;
a first fastener extending through said first side walls and said second side walls to pivotally connect said upper member and said lower member together, said first fastener defining a lateral axis between said upper member and said lower member; and
an adjustment mechanism cooperating with said first apertures of said upper member and said second apertures of said lower member to allow adjustment at different increments of adjustment about a lateral axis between said upper member and said lower member for a predetermined number of different and varying fixed joint angles about the lateral axis between said upper member and said lower member.

* * * * *